Figure 31:
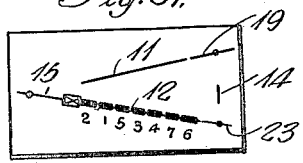

Aug. 1, 1933.  C. W. BURGER  1,920,291
EDUCATIONAL APPLIANCE
Filed May 5, 1932  3 Sheets-Sheet 1
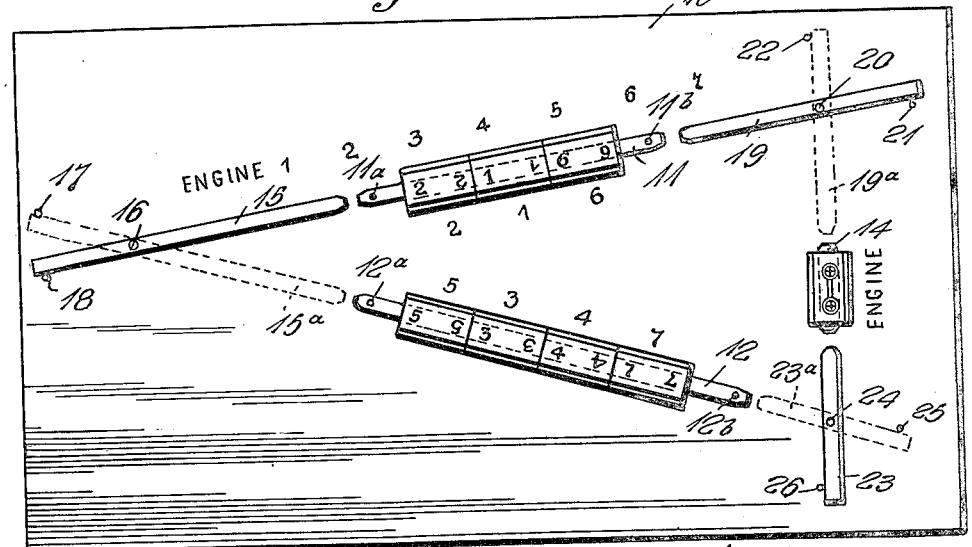
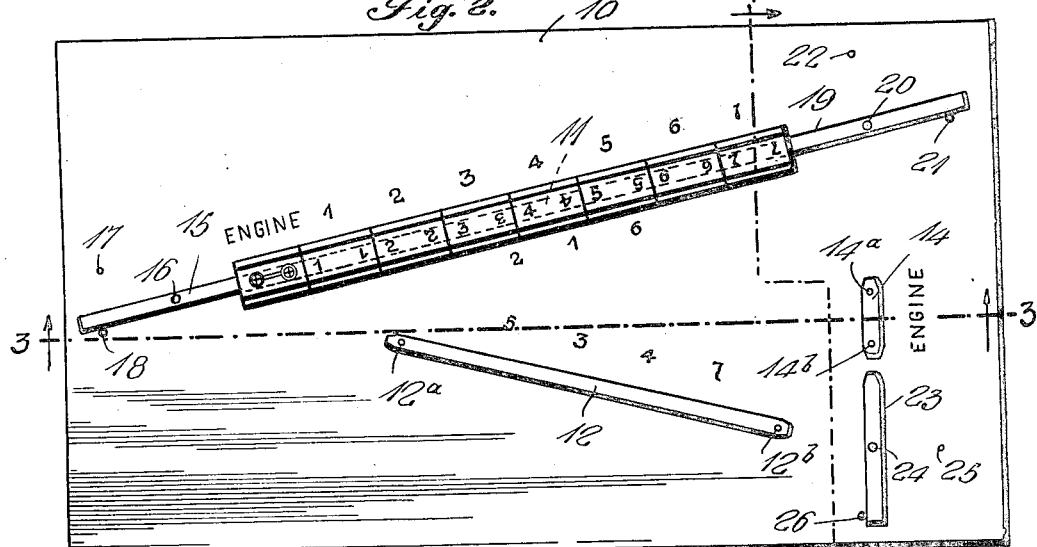
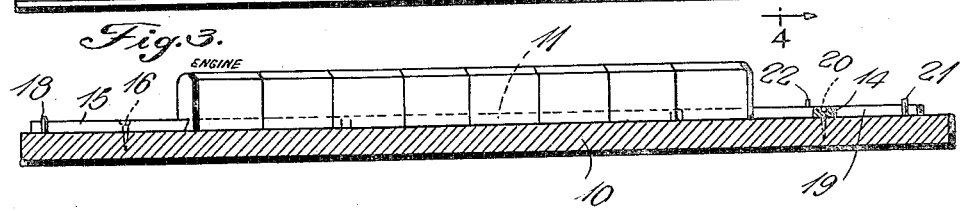
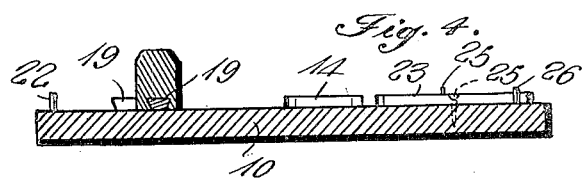
INVENTOR.
Clarence W. Burger.
BY John O Brady
ATTORNEY

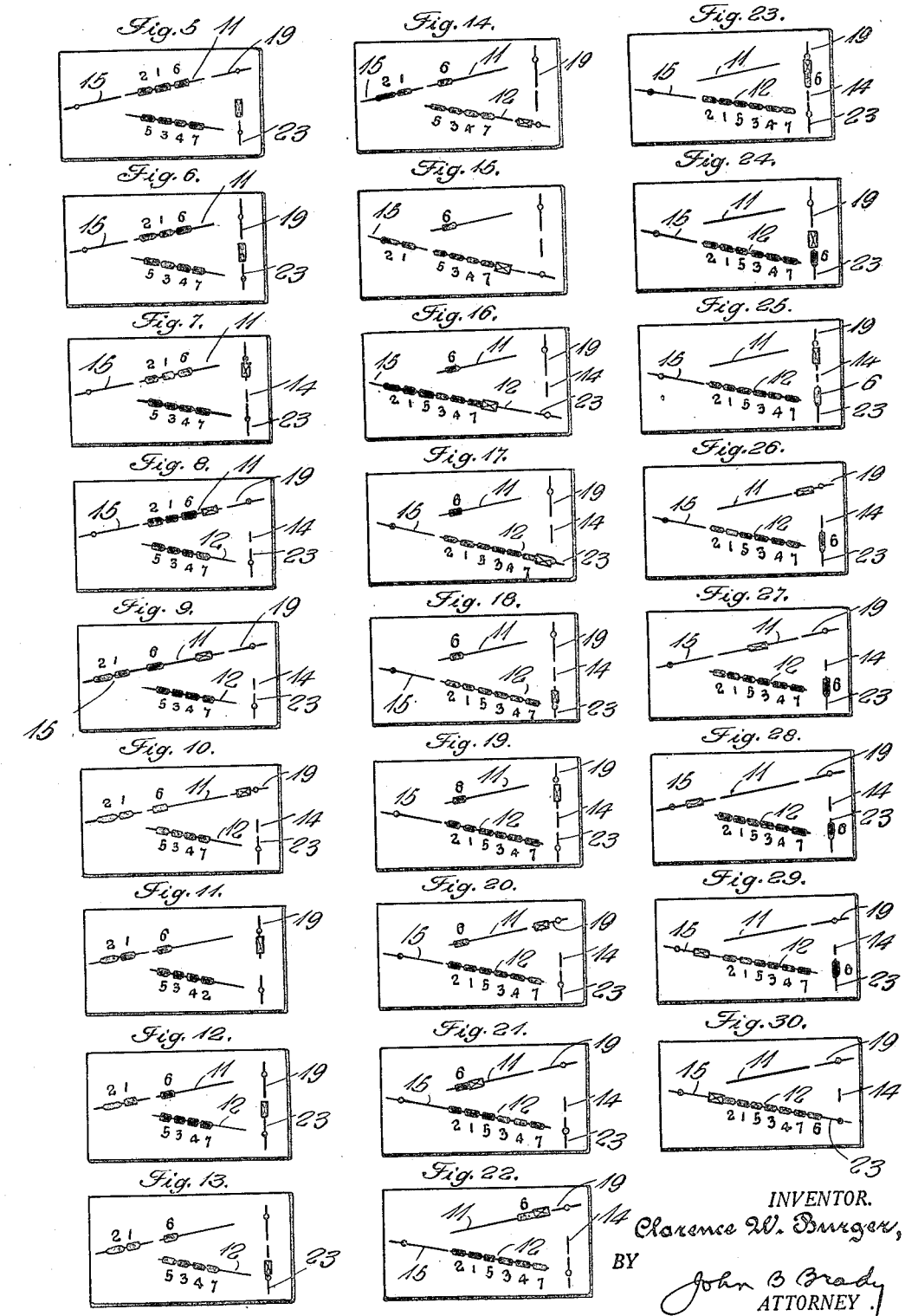

Aug. 1, 1933.  C. W. BURGER  1,920,291
EDUCATIONAL APPLIANCE
Filed May 5, 1932  3 Sheets-Sheet 3

INTERVAL
OF PLAYS
(NOT SHOWN HERE)

FINAL LINE-UP

INVENTOR.
Clarence W. Burger,
BY
John O. Brady
ATTORNEY.

Patented Aug. 1, 1933

1,920,291

UNITED STATES PATENT OFFICE 1,920,291

EDUCATIONAL APPLIANCE

Clarence W. Burger, Cherrydale, Va.

Application May 5, 1932. Serial No. 609,518

7 Claims. (Cl. 35—16.)

My invention relates broadly to educational appliances and more particularly to a device for railroad traffic and freight car switching and shifting instruction.

One of the objects of my invention is to provide a construction of device for teaching methods for shifting freight cars in railroad traffic operations.

Another object of my invention is to provide a device which may serve as a puzzle or game for effecting a shifting of freight cars on a game board representing a track system in similitude.

A further object of my invention is to provide a construction of game board having railway turn tables and track systems reproduced thereon in miniature and cooperatively arranged for effecting the shifting of freight cars in similitude from a disarranged order on one track system to a predetermined order on an adjacent track system.

Other and further objects of my invention reside in the construction of an entertainment and amusement device for simulating major traffic operations in railway freight yards as will be set forth more fully in the specification hereinafter following by reference to the accompanying drawings, in which:

Figure 1 is a plan view of the game board of my invention showing the original disarranged condition of freight cars represented in similitude on the track systems of a railroad yard; Fig. 2 is a plan view of the game board illustrating the final arrangement of the freight cars in proper order in the railroad freight yard subsequent to the shifting operation; Fig. 3 is a cross-sectional view taken through the game board on line 3—3 of Fig. 2; Fig. 4 is a lateral sectional view through the game board on line 4—4 of Fig. 2; Figs. 5 through 30, inclusive, show the series of operations necessary for assembling the entire train of cars in disarranged order by shifting the cars from one track system to another; and Figs. 31–55 illustrate the successive steps necessary for shifting the cars from the disarranged order into a proper successive order preparatory for departure of the train.

The device of my invention is instructive and also entertaining. The solution of the shifting operation presents a difficult puzzle which is solved only by the exercise of considerable ingenuity.

Referring to the drawings in detail, reference character 10 designates a base member on which the parts of the device of my invention are arranged. The base member 10 carries substantially centrally thereof a stationary track system consisting of the stationary track 11 secured to the base 10 by screws or nails 11a and 11b and also stationary track 12 secured to the base 10 by means of screws or nails 12a and 12b. The stationary tracks 11 and 12 are arranged on opposite sides of the center line of the base 10 and are disposed at acute angles to the center line of the base and extend toward each other. Extending normal to the center line of the base and adjacent the right hand end thereof, I provide a section of track on which the locomotive or engine may be normally stationed. There are three track sections mounted upon the base 10 for simulating turntables in the railroad yard. I have shown these turntables at 15, 19 and 23. The turntable 15 is pivoted at 16 and may be moved into alignment with stationary track section 11 or stationary track section 12 against limiting stops 17 and 18. The full line position of turntable 15 shows the turntable 15 in alignment with the track section 11. The dotted line position 15a of the turntable 15 illustrates the turntable in alignment with track section 12. The turntable 19 is pivoted at 20 and may be moved between limits defined by pin members 21 and 22 from the position illustrated by full lines 19 in alignment with track section 11 to the dotted line position 19a aligned with track section 14. The turntable 23 is pivoted at 24 and is shiftable from the position illustrated in full lines in alignment with stationary track 14 to the dotted line position 23a in alignment with stationary track section 12 within limits defined by pins 25 and 26.

The ends of each of the turntables 15, 19 and 23 which are aligned with the stationary track sections 11, 12 and 14 are tapered at their junctures to facilitate the transfer of the engine or the cars from the track to the turntable or from the turntable to the track. The relative lengths of the turntables and the track sections is highly important and it will be observed that track section 14 will accommodate only the engine or one car. The turntable 23 will accommodate only the engine or one car. The turntable 15 receives only the engine and two cars or will accommodate only the length of three cars. The turntable 19 will receive the engine and one car or a total of two car lengths. The engine or locomotive and the seven cars employed on the similitude track system are constructed to represent an actual locomotive and actual cars and may be cast to have the general appearance of such an engine or series of cars. In order to facilitate the illustration of the invention, I have shown the engine and the cars fashioned from blocks which may bear printed insignia or colored representations in order to impart a realistic appearance to the train. The track sections 11, 12 and 14 and the turntables 15, 19 and 23 are each tapered to fit within a mortised groove in the blocks representing the engine and cars. The track section 11 will accommodate four cars and the engine or a total length of five cars. The track section 12 will accommodate the engine and five cars or a total length of six cars.

The problem to be solved is the proper arrangement of the engine and cars on the track 11 starting with the disarranged order of the cars on both tracks 11 and 12. The cars are successively numbered 1, 2, 3, 4, 5, 6 and 7. The original arrangement of the cars is designated by numbers which are applied to the base 10 adjacent stationary track 11 and stationary track 12. That is, the numerals between the center line of the base 10 and the respective tracks 11 and 12 designate that cars "2, 1 and 6" are normally positioned on track 11 while cars "5, 3, 4 and 7" are normally positioned on track 12. The disarranged order has been shown in Fig. 1. The properly arranged order which is to be produced is illustrated in Fig. 2. The base 10 is provided with designating marks adjacent the track 11 and toward the outside edge of the base which marks are designated on the base as "Engine, 1, 2, 3, 4, 5, 6 and 7." The series of operations necessary to assemble the entire train on the lower track preparatory to the shifting of the cars in the numerical order has been illustrated in the successive steps set forth in Figs. 5–30.

Fig. 5 shows the cars and engine in their original position at the start of the game; Fig. 6 shows how the turntable 19 in the right hand corner of the base has also been swung about to receive the engine; Fig. 7 shows the engine moved upon the turntable 19; Fig. 8 shows that the engine has left the turntable 19 and entered track 11; and Figs. 9, 10 and 11 show how the engine has shifted the cars numbered 2 and 1 from track 11 onto the turntable 15 on the extreme left. The car 6 is pulled back by the engine and left standing on track 11 as shown in Fig. 9. The engine now proceeds towards the turntable 19 in the right upper corner as shown in Fig. 10. Fig. 11 shows the engine swung around on turntable 19; Fig. 12 shows that the engine has left the turntable 19 in the upper right hand corner and is proceeding towards the turntable 23 in the lower right corner; Fig. 13 shows the engine has arrived on the turntable 23 in the right hand corner; Fig. 14 shows that turntable 23 has been swung into alignment with track 12 and the engine is moving towards the left; Figs. 15 and 16 show how the engine has shifted the cars 5, 3, 4 and 7 on track 12 up to couple with cars 2 and 1 on turntable 15. The turntable 15 on the left carries the two cars 2 and 1 as shown. The turntable 15, together with the two cars numbered 2 and 1 is swung downwardly in alignment with track 12. Fig. 16 shows that the train of cars consists now of 2, 1, 5, 3, 4 and 7 and the engine. In Fig. 17 is shown how the engine shifts the train of cars towards the right and the engine is now standing on the turntable 23. Fig. 18 shows that the engine is now detached from the train of cars and is proceeding to travel to couple with the remaining car 6 as shown in Fig. 19. In Fig. 20, the engine is shown proceeding towards the left to couple with car number 6 on track 11. Fig. 21 shows the engine coupled to car 6 on track 11 and in Fig. 22, the engine is shown pulling car 6 towards the right on the turntable 19 in the upper right hand corner. Fig. 23 shows the engine standing on this turntable 19. This turntable is now swung about to allow the engine and cars to proceed towards lower right hand turntable 23. In Fig. 25, the engine is shown after having left car 6 on turntable 23. The turntable 19 to which the engine moves is swung around as shown in Fig. 26 and as shown in Fig. 27, the engine proceeds towards the left to a position on track 11. Fig. 28 shows the condition when the engine has reached the turntable 15 on the left. The turntable 15 on the left is swung about as shown in Fig. 29 in alignment with the track 12. In Fig. 30, the turntable 23 on the right hand side has been moved to allow car 6 to be coupled to the cars already assembled on track 12 and the engine advanced along the track 12 and couples with the cars now completely assembled on track 12. The engine is shown coupled to cars 2, 1, 5, 3, 4, 7 and 6 which are in disarranged order as indicated.

Figure 40:
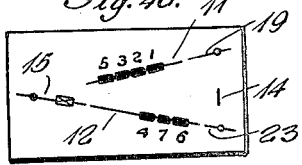
Figure 32:
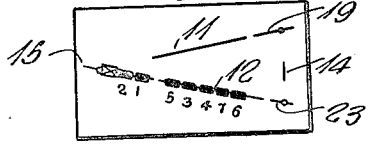
Figure 41:
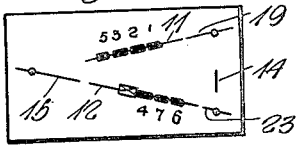
Figure 33:
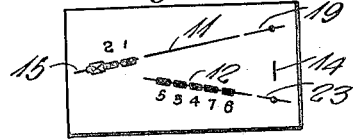
Figure 42:
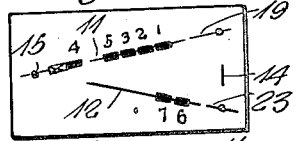
Figure 34:
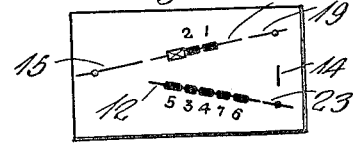
Figure 43:
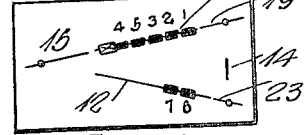
Figure 35:
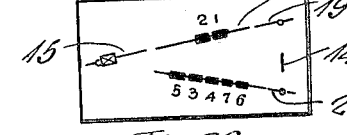
Figure 44:
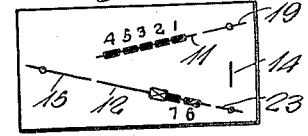
Figure 36:
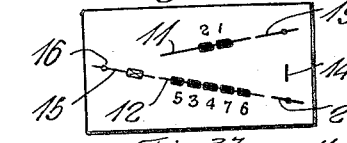
Figure 45:
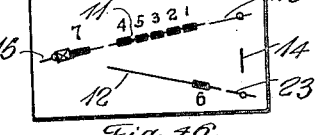
Figure 37:
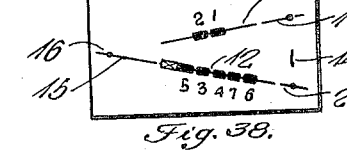
Figure 38:
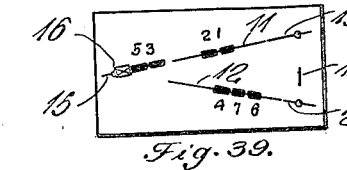
Figure 39:
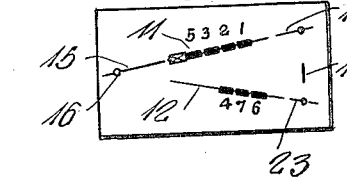

On sheet three of the drawings, Fig. 31 to Fig. 55, inclusive show how the cars are lined up in proper numerical order on the upper track 11. Fig. 31 shows the arrangement of the cars on the lower track 12 similar to the showing in Fig. 30 and the problem to be solved is how to get the cars on the upper track 11 in proper numerical order: First, the engine and then cars 1, 2, 3, 4, 5, 6 and 7. In Fig. 32, the engine has pulled two cars numbered 2 and 1 away from the train of cars 5, 3, 4, 7 and 6 and on turntable 15. In Fig. 33, the turntable 15 on the left is shown swung into alignment with the upper track 11 and carries with it the engine and cars number 2 and 1. In Fig. 34, I have shown how the engine and the cars 2 and 1 are further advanced on track 11. In Fig. 35, I have shown the two cars 2 and 1 left standing on the upper track 11 and the engine returned to turntable 15. In Fig. 36, I have shown the turntable 15 on the left swung about its pivot 16, together with the engine standing thereon. In Fig. 37, I have shown the engine leaving the turntable 15 and about to couple with cars 5 and 3 uncoupled from the rest of the cars. In Fig. 38, I have shown the engine, together with the cars 5 and 3 standing on the turntable 15, the latter being swung upwardly. In Fig. 39, I have shown the engine and the two cars 5 and 3 coupling with the two cars 2 and 1 already standing on the track 11. It will be observed that cars 4, 7 and 6 are still on the lower track 12. In Fig. 40, I have shown the turntable 15 swung about and the engine returned thereto and standing thereon. Fig. 41 shows the engine advanced on track 12 towards the train of cars 4, 7 and 6. Fig. 42 shows the turntable 15 swung about with the engine and car 4 standing thereon, the engine having coupled with car 4 and pulled it from track 12. Fig. 43 shows the car 4 coupling with the train of cars 5, 3, 2, and 1 already standing on the track 11. Fig. 44 shows the engine returning to the lower track 12 through turntable 15 for cupling with car 7. Fig. 45 shows the engine on the turntable 15 coupled with car 7. The engine has at last coupled with car 7 which is the accomplishment that the protracted series of operations has sought to obtain. Having obtained car 7, the engine in the next series of operations holds car 7 as it shifts back and forth in arranging the cars which have been shifted from the track 12 to track 11 so that the cars can be again restored to track 12. Car 6 is allowed to remain on track 12 in the position shown in Fig. 45 through and including the position shown in Fig. 53.

Figure 49:
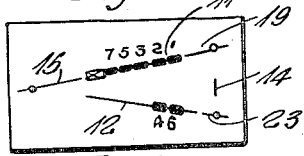
Figure 50:
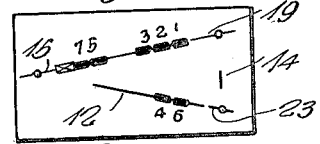
Figure 51:
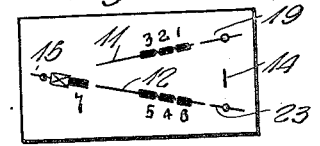
Figure 52:
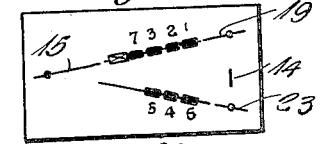
Figure 53:
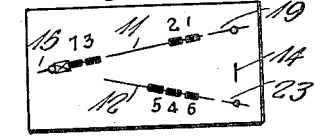
Figure 46:
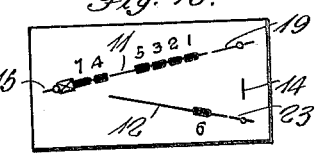
Figure 47:
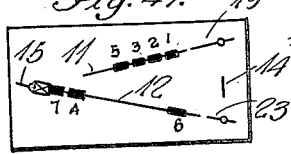
Figure 48:
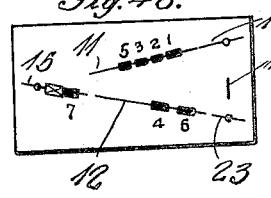

Fig. 46 shows the engine coupled to cars 7 and 4. In Fig. 47, I have shown the turntable 15 swung downwardly in line with the lower track 12 carrying with it the engine and cars 7 and 4. In Fig. 48, I have shown the engine on the lower track 12 uncoupling car 4 but retaining car 7. Fig. 49 shows the engine on the upper track 11 carrying with it car 7 still in coupled relation. In Fig. 50, I have shown the engine returning with car 7 still in coupled relation and with car 5 connected thereto. In Fig. 51, I have shown the turntable 15 swung about and the engine carrying car 7 standing on the turntable 15. Car 5 has been uncoupled from the engine carrying the car 7 and this car has now been coupled with the train of cars 4 and 6. Fig. 52 shows the engine returning to the upper track 11 to get cars 3, 2 and 1. Fig. 53 illustrates the manner in which car 3 is transferred to the lower track 12 from upper track 11.

Figure 54:
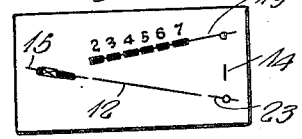
Figure 55:
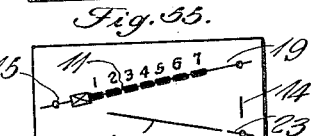

Next follows a series of plays not illustrated in the drawings for the purpose of simplification. However, the purpose of the successive plays is to restore to track 12 the successive cars by individual shifting operations of the engine. Thus, car 2 is placed upon lower track 12 and then car 1 is placed upon lower track 12. The track 12 is now clear and the engine is prepared to perform its last operation of restoring the cars to track 11 in numerical order corresponding to the successive numbering plan which appears on the base 10 adjacent the outside edge of track 11. The first operation is for the engine to run car 7 up track 11 and uncouple car 7 in the position shown. It will be observed that car 6 is at the extreme right end of the track 12 in Fig. 53. It is, therefore, necessary to restore all of the cars in succession temporarily to track 11 until the engine can couple with car 6. The engine then holds car 6 in the same manner that car 7 was originally held and the remaining cars are successively returned to track 12 leaving car 6 coupled with the engine. As soon as track 11 is clear and contains only car 7 standing thereon, the engine shifts car 6 into coupled relation with car 7 so that finally the two cars are in proper order on track 11. This shifting operation is now repeated, the engine in each instance holding the car which is desired and restoring the cars which are out of proper numerical order to track 12 until track 11 is clear to allow the car in proper numerical order to be shifted into coupled relationship with the adjacent car. Fig. 54 indicates the way in which the cars are all returned to track 12 in proper numerical order and showing car 1 being finally returned to track 11 for completing the operation. Fig. 55 shows the cars all shifted to track 11 and in proper numerical order with track 12 entirely clear which is the final result to be obtained in the game.

I have found the game apparatus and method of playing the game of my invention highly entertaining, puzzling and amusing at the same time extending instruction to those interested in the subject of railroad traffic operations.

What I claim as new and desire to secure by Letters Patent of the United States is as follows:

1. In an educational game, a portable board, three independent stationary track members located on said board and extending along lines which form a triangle when projected, and a movable track member pivoted at each of the apex positions of said triangle and selectively movable into alignment with adjacent stationary track members for permitting transfer of an engine and cars in similitude along the track members from a disordered arrangement upon certain of the stationary track members to an assembled orderly alignment upon a selected set of track members disposed in alignment.

2. In an educational game, a base member, a set of three stationary track members secured to said base member, said track members extending in directions which when completed by imaginary lines constitute a triangle, an angularly movable track member pivoted at each apex position of the imaginary triangle and each shiftable into alignment with selected stationary track members for facilitating the transfer of an engine and cars in similitude from one track member to another.

3. In an educational game, a base member, a plurality of track sections secured to said base member, a turntable disposed adjacent the ends of each of said track sections for cooperation with a pair of track sections, individually movable members representing an engine and associated cars engaged on said track sections and shiftable from one track section to another by operation of said turntables, one of said turntables accommodating the length of the engine or one car, another of said turntables accommodating the length of the engine and one car, and the other of said turntables accommodating the length of three cars or the engine and two cars for effecting the shifting operation from one track section to another for arranging said engine and cars in predetermined numerical order as distinguished from an initial disassembled order.

4. In an educational game, a game board, a plurality of track members secured to said game board, a plurality of turntables pivotally mounted adjacent the adjoining ends of said track members, two of said track members having numbered stations adjacent thereto in confused order, movable members engageable with said track members, each of said movable members being numbered to correspond with the numbered stations adjacent said track members, and a series of stations numbered in sequence adjacent one of said track members, and a master control member movable along said track sections for individually shifting said movable members on said track sections for displacing said movable members from the confused position thereof and arranging said members in numerical positions according to said last mentioned numerically arranged stations.

5. An educational game comprising a board, movable track sections pivotally mounted at corners of a triangular path, stationary track sections carried by said board and each extending longitudinally of a side of the triangular path with its ends spaced from corners of the triangle and permitting the movable track sections to be swung about their pivots and disposed in alignment with selected stationary track sections, and miniature cars movable along said track sections and bearing identification marks.

6. An educational game comprising a board, movable track sections pivotally mounted upon said board at corners of a path defining a geometrical figure, stationary track sections carried by said board and extending along sides of the path with their ends spaced from corners thereof a sufficient distance to permit the movable track sections to be swung about their pivots and disposed in alignment with selected stationary track sections with their ends close to ends of the stationary track sections, means for limiting swinging movement of the movable track sections, and miniature cars movable along said track sections and bearing identification marks.

7. An educational device consisting of a game and comprising a board, stationary track sections fixed upon said board and extending along the sides and base of a triangular path, each track section being disposed intermediate the length of its portion of the path with ends spaced from corners of the triangle, movable track sections pivoted intermediate their ends at corners of the triangle for movement into alignment with selected stationary track sections, and a plurality of objects representing a train of cars, said objects being consecutively identified and slidable along the track sections from one section to another whereby the objects may be initially distributed upon the stationary sections in disordered arrangement and after being shifted along the track sections assembled upon a stationary section and pair of movable sections in consecutive order.

CLARENCE W. BURGER.